Figure 1:
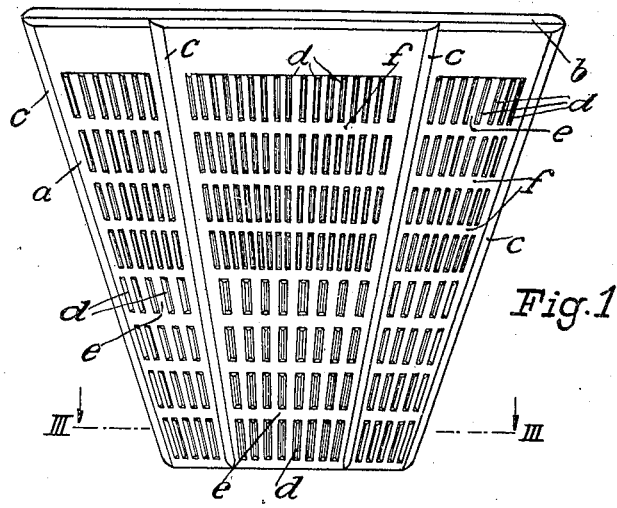

Oct. 7, 1941.   W. J. FISCHBEIN   2,257,944

FILTERING VESSEL FOR COFFEE AND THE LIKE

Filed Feb. 28, 1939

Inventor:
Wm. J. Fischbein,
By Watson E. Coleman

Patented Oct. 7, 1941

2,257,944

UNITED STATES PATENT OFFICE 2,257,944

FILTERING VESSEL FOR COFFEE AND THE LIKE

Wilhelm J. Fischbein, New York, N. Y.

Application February 28, 1939, Serial No. 259,038

3 Claims. (Cl. 210—162)

This invention relates to a filtering vessel for the rapid filtering of coffee and the like without the use of a filtering bag composed of paper or fabric.

In the percolation of coffee it has been found desirable to allow the boiling water to enter into contact with the ground coffee only for such length of time as the flavour requires to pass from the ground coffee to the filtrate, without the tannic acid which is contained in the ground coffee having time to enter into solution to an extent sufficient to impair the flavour of the resulting beverage. When using a filtering bag composed of paper this transfer of the tannic acid to the filtrate can be avoided only in very incomplete fashion, whilst moreover the time required for preparing the beverage is unnecessarily prolonged.

It has already been proposed heretofore to employ filtering vessels consisting of a ceramic material which by certain additions has been made so porous that the hot water permeates gradually through the wall of the vessel to the outside, whilst the coffee powder remains adhering to the inner face of the wall. These filtering vessels have not proved to be of a serviceable nature, and moreover they are not adapted for manufacture on a large scale.

Further, it has also been proposed in a prior patent to produce a filtering element from conically wound wire. The surface of the wire convolutions is intended to act as a suitable depository for the pulverulent matter, whilst the spaces between the convolutions act as passages for the filtrate.

It is the object of the invention to provide an improved type of filtering vessel for the preparation of coffee, which not only permits of filtration of the coffee without the transfer of any appreciable amount of tannic acid to the filtrate, but is also simple and cheap to produce, and in the accomplishment of this object the invention accordingly resides in a single-part coffee-filtering vessel, the material of which is a poor conductor of heat and in which the narrow openings for the passage of the filtrate are so arranged that the filtrate passing through the openings to the outside quickly runs off along the outer wall. For this purpose there are provided in a preferably frustro-conical hollow body axially disposed narrow slots, which are distributed over the side walls in close proximity to each other and have their smallest expanse on the inner wall of the container, whilst they are enlarged towards the outside of the vessel, so that the filtrate passing through these gaps or slots is able to collect quickly in the form of drops which, being initially directed in their movement by the slots, then run down the conical outer wall of the container by the shortest path, exert a suctional action on the slots over which they pass, and thus expedite the accumulation and discharge of the filtrate.

To enable a filtering vessel of this nature to be introduced into the opening of a coffee pot, teapot or the like there are provided on the outside of the vessel in uniform spacial disposal to one another axially directed ribs, which at the upper end preferably merge into an annular reinforcement about the edge of the vessel and are tapered at the bottom.

The bottom of the frustro-conical vessel is preferably furnished with annularly disposed slots similar to those in the wall of the vessel.

It has been found possible to produce a filtering vessel of this nature from a heat-resisting synthetic material, such as the substance known as Bakelite or a similar material, in a single operation by extrusion.

A filtering vessel of the kind described is very simple to use. The ground coffee is placed on the bottom of the vessel and rises immediately as the boiling water is poured in, being distributed over the inner wall of the vessel, where it remains adhering. The moisture absorbed by the coffee powder passes to the outside owing to capillary attraction exerted by the first slots, and collects there and runs down into the coffee pot.

Figure 3:
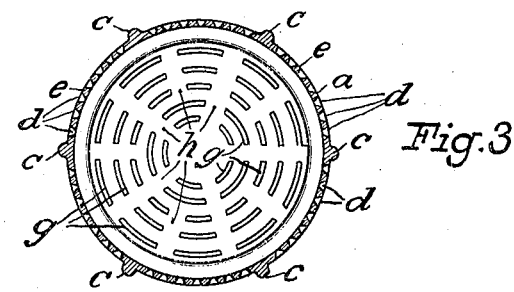
Figure 2:
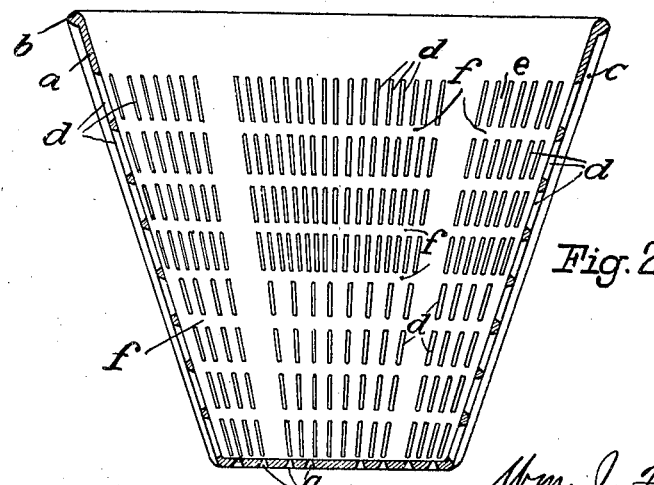

The invention is illustrated by way of example in the accompanying drawing, in which Fig. 1 is an elevational view of a preferred embodiment of the filtering vessel according to the invention, Fig. 2 being a vertical section through the embodiment according to Fig. 1, whilst Fig. 3 is a section on the line III—III in Fig. 1.

The frustro-conical vessel a is furnished at the upper edge with a reinforcement b, into which there merge the axially disposed ribs c furnished about the outer wall of the vessel. In the fields or panels between the ribs c there are provided axially disposed slots d, which have their smallest expanse on the inner wall of the vessel and are enlarged to several times this size on the outer wall.

In order to furnish the webs remaining between the slots with a sufficient hold, these webs do not run from the top to the bottom, but are interrupted by peripheral supporting rings f. It is preferable not to allow these supporting rings

*f* to extend beyond the surface of the webs, so that no resistance will be offered to the drops of filtrate running down the outer wall of the vessel.

As shown in Fig. 3, the bottom of the vessel is furnished with concentrically disposed slots *g* separated by radially extending webs *h*. These slots *g* also increase in size towards the outside.

The slots on the inner wall of the vessel are so small that water poured into the vessel at first rises therein, taking with it the ground coffee which it deposits against the inner wall. The ground coffee absorbs a certain quantity of liquid, which then penetrates through the slots to the outside. The narrow slots *d* exert a capillary attraction and thus assist the passage of the filtrate through the slots and its separation from the filtered substance remaining in the vessel. The filtrate passing to the outside of the vessel quickly collects under the action of the surface tension of the liquid into drops, which move axially downwards in the direction of the slots, increasing in size and exerting a suctional action on the slots as they pass, so that they assist towards a rapid discharge of the filtrate, which remains substantially free from tannic acid.

It will be noted that the arrangement or disposition of the slits *d*, is in groups which are longitudinally spaced and also circumferentially spaced and that these slits or slots of the upper groups are disposed closer together than those of the lower groups. Also the slits of one group are in alignment with those of an adjacent group and by this arrangement the drops of fluid as they leave the lower end of the slits will flow directly into the end of an underlying slit so as to maintain a constant flow of fluid, by suctional action as previously stated, through all of the slits of the device. It is also to be pointed out that while the device has numerous slits formed therein the grouping of these slits in the manner described prevents undue weakening of the wall structure whereas if the slits were formed continuous from the top to the bottom of the wall construction would be materially weakened.

As shown by the drawing, it is possible by reason of the design and arrangement of the slots according to the invention to produce the filtering vessel from a synthetic material in mass scale production, for example by extrusion. More particularly there can be employed for the filtering vessel thermoplastic synthetic substances such as phenol resins, with or without filling substances, and all synthetic resins which are capable of being hardened, such as resins produced from phenol and formaldehyde, and also synthetic resins obtained by polymerisation. It is possible to employ any synthetic material which is sufficiently unbreakable, does not affect the flavour, is sufficiently heat-resisting, is not attacked by acids and alkalis, and is suitable for use in large-scale production. The majority of the synthetic substances concerned are sufficiently poor conductors of heat, so that the filtrate running down the outer wall of the vessel is not excessively cooled.

What I claim as new and desire to secure by Letters Patent is:

1. A filtering vessel having a plurality of vertical slits in the wall thereof, said slits being of gradually increasing width from the inner to the outer side of the wall, the slits being of sufficient fineness to exert a capillary effect upon fluid within the receptacle, said slits being arranged in groups spaced longitudinally and circumferentially of the vessel, and the slits in the lowermost groups being fewer in number and spaced farther apart in the direction of the circumference of the vessel than the slits in the upper groups.

2. A filtering vessel having a plurality of vertical slits in the wall thereof, said slits being of gradually increasing width from the inner to the outer side of the wall, the slits being of sufficient fineness to exert a capillary effect upon fluid within the receptacle, said slits being arranged in groups spaced longitudinally and circumferentially of the vessel, the groups of slits being horizontally divided into an upper division of groups and a lower division of groups, the slits in the lowermost, division of, groups being fewer in number and spaced farther apart in the direction of the circumference of the vessel than the slits in the upper, division of, groups, and the slits in each of the upper groups being arranged in longitudinal alinement with slits of adjacent vertically spaced groups, of the same division, and the slits in each of the lower, division of, groups being arranged in alinement with the slits of the adjacent vertically spaced groups, of the same division.

3. A filtering vessel having a plurality of vertical slits in the wall thereof, said slits being of gradually increasing width from the inner to the outer side of the wall, the slits being of sufficient fineness to exert a capillary effect upon fluid within the receptacle, said slits being arranged in groups spaced longitudinally and circumferentially of the vessel, the slits in the lowermost groups being fewer in number and spaced farther apart in the direction of the circumference of the vessel than the slits in the upper groups, and the outer side of the wall of the vessel being provided with longitudinally extending outstanding ribs which extend along the line of circumferential spacing for the groups.

WILHELM J. FISCHBEIN.